United States Patent
Nilsson et al.

(10) Patent No.: US 6,243,956 B1
(45) Date of Patent: Jun. 12, 2001

(54) DRIVING DEVICE

(75) Inventors: Dan Nilsson, Sjuntorp; Ove Donnerdal, Sävedalen; Håkan Larsson, Mölndal, all of (SE)

(73) Assignee: Aktiebolaget Electrolux (SE)

( * ) Notice: Subject to any disclaimer, the term of this patent is extended or adjusted under 35 U.S.C. 154(b) by 0 days.

(21) Appl. No.: 09/445,567

(22) PCT Filed: Jun. 9, 1998

(86) PCT No.: PCT/SE98/01099

§ 371 Date: Dec. 9, 1999

§ 102(e) Date: Dec. 9, 1999

(87) PCT Pub. No.: WO98/58757

PCT Pub. Date: Dec. 30, 1998

(30) Foreign Application Priority Data

Jun. 25, 1997 (SE) .................................... 9702438

(51) Int. Cl.⁷ .................................... B23D 45/16
(52) U.S. Cl. .................... 30/389; 474/174; 474/177
(58) Field of Search .................. 30/389, 388; 451/294; 474/174, 177, 178; 83/676; 125/13.01

(56) References Cited

U.S. PATENT DOCUMENTS

| | | | |
|---|---|---|---|
| 3,186,247 | * 6/1965 | Burrell | 474/177 |
| 3,805,661 | 4/1974 | Tuomaala | 83/666 |
| 4,472,880 | 9/1984 | Johansson | 30/389 |
| 4,646,607 | * 3/1987 | Johansson | 30/389 X |
| 4,793,065 | 12/1988 | Johansson | 30/389 |
| 4,934,238 | 6/1990 | Lauffer | 83/666 |
| 5,381,723 | 1/1995 | Nilsson et al. | 91/437 |

OTHER PUBLICATIONS

International Search Report for PCT/SE98/01099 dated Sep. 4, 1998.
PCT Application (PCTSE98/01099) Published by WIPO No. WO 98/58757, Dec. 30, 1998.
PCT Application (PCTAU93/00638) Published by WIPO No. WO 94/13964, Jun. 23, 1994.
International Preliminary Examination Report for PCT/SE98/01099 dated May 17, 1999.

* cited by examiner

*Primary Examiner*—Douglas D. Watts
(74) *Attorney, Agent, or Firm*—George T. Marcou; Kilpatrick Stockton LLP

(57) ABSTRACT

A drive wheel for off-center drive of an annular saw blade in a cutting machine, consists of at least two components, which are separable but held together during operation, namely a holding disc and a drive ring, the latter having an encircling drive groove for the inner edge of the saw blade, the drive ring being arranged radially outside a central portion of the holder disc.

8 Claims, 3 Drawing Sheets

DRIVING DEVICE

TECHNICAL FIELD

The invention relates to a drive wheel for off-centre drive of an annular saw blade in a cutting machine.

BACKGROUND OF THE INVENTION

U.S. Pat. No. 4,472,880 describes a cutting machine with annular saw blade, which has an inner edge which is bevelled in a wedge-shaped manner, co-operating with a drive wheel inside the inner edge of the blade. The drive wheel consisted according to this patent of two halves which were pressed against each other in axial direction by a strong string. At the same time, the two halves of the drive wheel pressed the inner edge of the cutting blade between themselves, which gave a good grip but which also resulted in a hard wear. This design therefor was abandoned for an undivided drive wheel with a design disclosed in U.S. Pat. No. 4,793,065, FIG. 3. The grip between the inner edge of the saw blade and the drive wheel with its groove in this design is provided by the blade being pressed in a radial direction into a groove in the drive wheel. The wear thereby is reduced in comparison with the wear in the first embodiment according to U.S. Pat. No. 4,472,880 but is nevertheless substantial. Both the drive wheel and the saw blade are therefor to be considered as replacement parts which must be replaced when they have been worn out. The drive wheel in general certainly has a longer lifetime than the saw blade, but the costs for the exchange are nevertheless considerable. Nor is it beneficial from all parts of view that the saw blade and the drive wheel are replacement parts with substantially different lifetime, since this may increase the number of necessary replacement operations.

BRIEF DESCRIPTION OF THE INVENTION

The object of the invention is to address the above problem complex. This is accomplished by the drive wheel consisting of at least two annular components which are separable but held together during the operation, namely a holder disc and a drive ring, the latter having an encircling drive groove for the inner edge of the saw blade, and that the drive ring is arranged radially outside of a central portion of the holder disc. By this design, the drive ring can be made as a very simple machine element with a small mass, which in its turn opens up for possibilities to manufacture the drive ring of a comparatively plane construction material, preferably a plane structural steel, which suitably wears down at the same rate as the saw blade and is replaced at the same time as the saw blade, while the holder part—the holder disc—is made of a more high-grade constructional material. As an alternative, the drive ring is made of a still more high-grade constructional material than the holder disc, e.g. a high-grade high speed steel or cemented carbide material with very long lifetime and is in this case not to be considered as a replacement part in the normal sense of the word.

Additional characteristics and aspects of the invention appear from the claims and from the following detailed description of a preferred embodiment.

BRIEF DESCRIPTION OF THE DRAWINGS

In the detailed description, reference is made to the accompanying drawings, of which

DETAILED DESCRIPTION OF THE INVENTION

Figure 1:
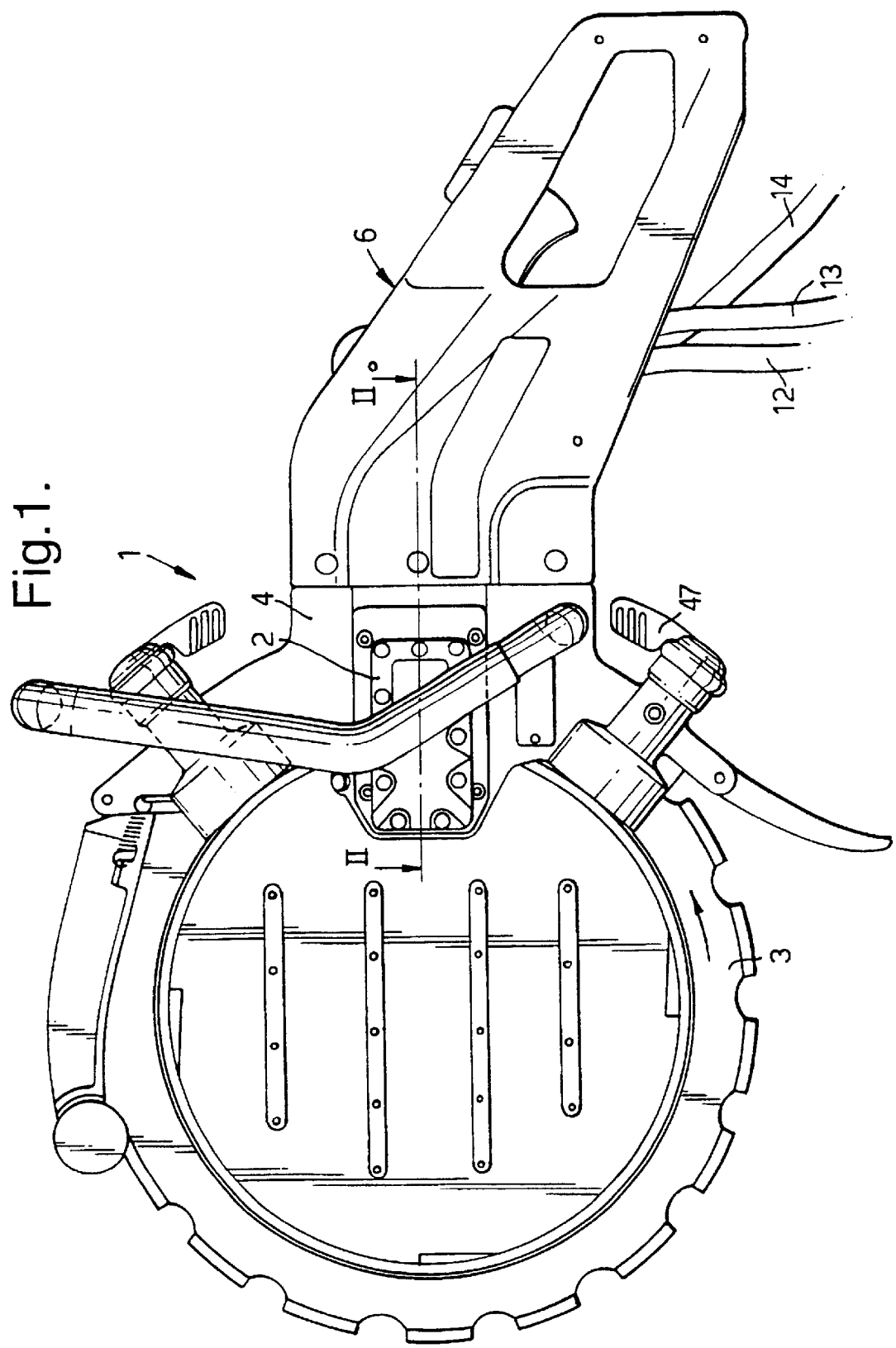
FIG. 1 is a side view of a cutting machine, where the drive wheel according to the invention can be used.
Figure 2:
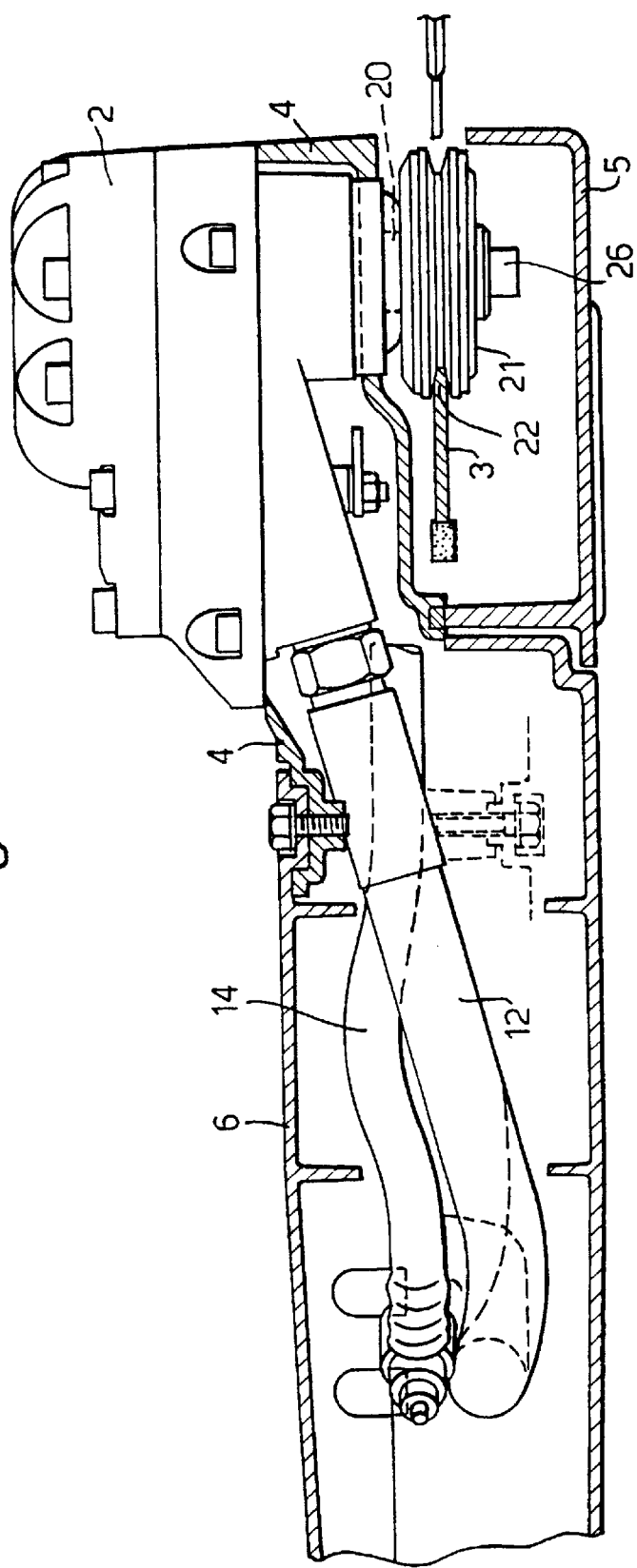
FIG. 2 shows a view II—II in FIG. 1.

With reference first to FIGS. 1 and 2, a cutting machine is denoted 1 and an annular saw blade, driven by a hydraulic motor 2, is denoted 3. The main parts of the cutting machine 1 consist of a chassis 4 on which the hydraulic motor 2 is mounted and which contains not shown guide rollers for the saw blade 3, a support roller cover 5, which contains not shown support rollers for the saw blade, and a manoeuvring arm 6 with controls for the hydraulic motor 2. The hydraulic motor 2 is mounted on the chassis 4 and is of the type described in U.S. Pat. No. 5,381,723. A pair of conduits for hydraulic oil has been denoted 12, 13 and a conduit for cooling water has been denoted 14.

Figure 3:
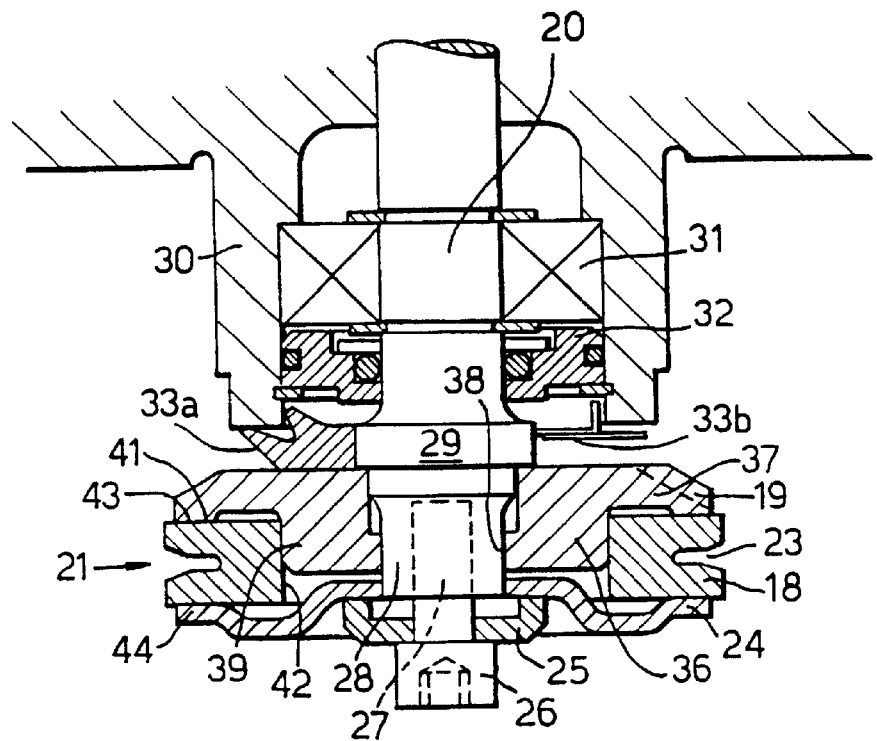
FIG. 3 shows a drive wheel in cross section, mounted on a drive shaft.

Between the chassis 4 and the support roller cover 5, there is a drive wheel 21 which is rotated by the hydraulic motor 2 via a drive shaft, generally denoted 20, FIG. 3.

The drive wheel 21 consists of a drive ring 18, a holder disc 19 and an attachment plate 24. In addition, there is included in the mounted unit a washer 25 and a screw 26, which co-operates with a threaded, central hole 27 in a shaft journal 28. On the shaft 20 there is also a flange 29 inside the shaft journal 28. A bearing housing on the hydraulic motor 2 has been denoted 30. For the bearing of the shaft 20 in the bearing housing, there is a ball bearing, 31. Between the bearing 31 and the drive wheel 21 there are inner sealing means 32 and outer sealing means, which in some different embodiments have been denoted 33a, 33b and 33c, respectively. It should be understood that two different embodiments have been illustrated in FIG. 3 in order to reduce the number of drawings.

The holder disc 19 consists of a central portion 36 and a peripheral portion 37. The central portion 36 has a centre hole 38, which matches the outer shape of the shaft journal 28. The latter is bevelled to approximately oval shape in a known manner and the hole 38 has a corresponding shape, which prevents the holder disc 19 from rotating on the shaft journal 28. The central portion 36 of the holder disc 19 further has a peripheral, circular-cylindrical surface 39. The peripheral portion 37 of the holder disc is axially displaced from that section of the central portion 36 on which the circularcylindrical surface 39 is provided. The outer diameter of the holder disc 19 is somewhat smaller than the outer diameter of the drive ring 18. The peripheral portion 37, finally, has an annular flange 41, facing the drive ring 18.

The drive ring 18 has a inner circular-cylindrical surface 42 and is thread upon the central portion 36 of the holder disc 19 with good fitting between the two cylindrical surfaces 39, 42. Both sides 43, 44 of the drive ring 18 are flat. In the drive ring 18 there is a groove 23, here called a drive groove, and which may have a shape known per se in order to accommodate the wedge shaped inner edge 22 of the saw blade 3. The groove 23 thus in cross section has a wedge-shaped mouth, a rounded bottom and parallel walls between the mouth and the bottom. The invention is however not limited to the shown geometries of the inner edge of the saw blade and the drive groove. To the extent that other geometries exist, or can be suggested, the principle of the invention can be used for those as well.

In the mounted drive wheel 21, the drive ring 18 is pressed upon the central portion 36 of the holder disc 19 with the two cylindrical surfaces 39 and 42 in contact with each other. The screw 26 presses the washer 25 against the attachment plate 24, the outer edge portion of which is pressed against the outside of the drive ring 18, so that the drive ring is clamped between the outer flange 41 of the holder disc and the edge portion of the attachment plate 24. Moreover, the holder disc 19 and thus the entire drive wheel 21 is pressed against the flange 29 of the drive shaft 20. The sealing rings 33a, 33b or 33c accomplishes a sealing between either the shaft 20 and the bearing housing 30, more precisely between the shaft flange 29 and the bearing housing 30, according to the two alternatives shown in FIG. 3, that is with the sealing ring in embodiment 33a or 33b, or between the drive ring 21 and the bearing housing 30, as with the sealing ring 33c, FIG. 4. In embodiment 33a, the sealing ring consists of an inner steel washer, which is clamped on the flange 29 and a rubber ring with lips, one of the lips contacting the bearing housing 30. In embodiment 33b, the sealing consists of a labyrinth sealing, comprising a ring which is clamped on the flange 29.

Figure 4:
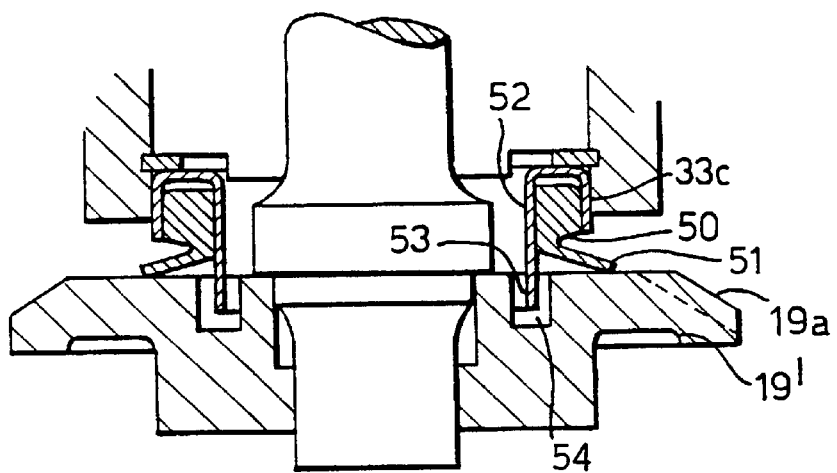
FIG. 4 shows a variant of how a sealing between the drive wheel and a drive motor can be performed.

The embodiment 33c, FIG. 4, is a combined glide sealing and labyrinth sealing, comprising a rubber ring 50 with a tongue 51 in slidingly contact with the holder disc 19', and a bent steel ring 52. The rubber ring 50 is pressed into the steel ring 52. The steel ring itself is pressed in on the inside of the bearing housing 30 and is provided with a tongue 53 which extends into an annular groove 54 in the upside of the holder disc 19', which gives labyrinth effect.

The drive ring 18 may be made of a very high-grade material, such as a high-grade high speed steel or cemented carbide, whereby it gets a long lifetime but on the other hand becomes relatively costly. As an alternative, the drive ring 18 may instead consist of a relatively plain constructional steel with comparatively low hardness. This has the potential benefit that the grip between the groove 23 and the wedge shaped edge 22 of the saw blade 3 may be very efficient as compared with what can be achieved when the drive ring 18—or the entire drive wheel, according to known technique—has a greater hardness. Another beneficial and desired effect is that the drive ring 18 may be worn out at essentially the same rate as the saw blade, or be durable for the lifetime of a few saw blades, and therefor suitably may be replaced at the same time as the saw blade is replaced. When the saw blade 3 and the drive ring 18 are to be replaced, the support roller cover 5, FIG. 2, is loosened whereby at the same time the support rollers are removed and the screw 26 is exposed. The saw blade 3 is thereafter completely loosened by loosening of the guide rollers in the chassis 4 by means of the handle 47, FIG. 1, whereafter the saw blade is removed. Thereafter, the screw 26 is loosened, whereafter the entire drive wheel 21 can be loosened from the shaft journal 28. Finally, the drive ring 18 is pulled loose from the holder disc 19 and is replaced by a new one, whereafter the continued mounting takes place in a way that not ought to demand any further explanation. In order to facilitate the pulling to loosen the drive ring, it is bevelled in its upper, inner edge, so that the length of contact between drive ring and holder disc becomes short. Additionally the drive disc 19 is provided with recesses 19a, FIG. 4, for a key or other grip means. It should be mentioned in this connection that the sealing ring, no matter which of the embodiments 33a, 33b or 33c is used, is all the time stuck either to the shaft flange 29 or in the bearing housing 30 and normally does not need to be replaced.

What is claimed is:

1. Driving device comprising a drive shaft (20) and a drive wheel for off-center drive of an annular saw blade (3) in a cutting machine, said drive shaft having an end portion (28) adjacent to a front end thereof and a threaded, central hole (27) in said end portion, said drive wheel comprising at least two annular components, namely a holder disc (19) and a drive ring (18), said holder disc comprising a central portion (36) with a center hole (38) and a peripheral portion (37), said holder disc being mounted on said end portion of the drive shaft, said center hole of said holder disc matching the outer shape of at least a section of said end portion of the drive shaft, said drive ring, which is arranged radially outside of said central portion of the holder disc, having an outer periphery with an encircling drive groove (23) for the inner edge (22) of the saw blade, an inner periphery, a rear surface, and a front surface, at least a section of said inner periphery having a surface (42) which matches an outer peripheral surface (39) on said central portion (36) of the holder disc, wherein a clamping means (24) is provided axially outside of said front end of the drive shaft, said clamping means comprising an attachment plate (24) and a screw with a screw head outside of the attachment plate, said screw with its head outside of said attachment plate extended through said plate and into said threaded hole (27) in the end portion of the drive shaft, cooperating with said threaded hole, clamping the drive wheel between said clamping means and said peripheral portion of the holder disc.

2. Driving device according to claim 1, wherein the center hole of the holder disc is designed to prevent the holder disc from rotating on the drive shaft.

3. Driving device according to claim 1, wherein said attachment plate abuts the axial outside of the drive ring.

4. Driving device according to claim 1, wherein a clamping washer (25) is provided between said attachment plate and said screw head.

5. Driving device according to claim 1, wherein the peripheral portion of the holder disc is pressed against the drive wheel within an annular region of the rear surface of the peripheral portion of the holder disc, said annular region being located at a radial distance from the center of the drive shaft substantially corresponding to the radial location of said drive groove with reference to said center of the drive shaft.

6. Driving device according to claim 5, wherein the peripheral portion has an annular flange (41), facing the drive ring and defining said annular region of the rear surface of the holder disc.

7. Driving device according to claim 6, wherein said annular flange (41) is provided adjacent to the periphery of said peripheral portion.

8. Driving device according to claim 1, wherein the drive shaft is provided with a shaft flange (29) at the rear of the end portion of the drive shaft, said rear surface of the holder disc being pressed against said shaft flange by a force exerted by said screw (27).

* * * * *